(12) United States Patent
Walenta (10) Patent No.: US 11,989,080 B2
(45) Date of Patent: May 21, 2024

(54) QUANTUM BIT ERROR RATE MINIMIZATION METHOD

(71) Applicant: ID QUANTIQUE SA, Carouge (CH)

(72) Inventor: Nino Walenta, Bad Saarow (DE)

(73) Assignee: ID QUANTIQUE SA, Carouge (CH)

( * ) Notice: Subject to any disclaimer, the term of this patent is extended or adjusted under 35 U.S.C. 154(b) by 666 days.

(21) Appl. No.: 17/110,545

(22) Filed: Dec. 3, 2020

(65) Prior Publication Data

US 2021/0173733 A1 Jun. 10, 2021

(30) Foreign Application Priority Data

Dec. 6, 2019 (EP) .................................. 19214208

(51) Int. Cl.
| | |
|---|---|
| G06F 11/07 | (2006.01) |
| G01R 19/25 | (2006.01) |
| G06N 10/00 | (2022.01) |
| H04B 10/079 | (2013.01) |
| H04B 10/54 | (2013.01) |
| H04B 10/70 | (2013.01) |
| H04L 9/08 | (2006.01) |

(52) U.S. Cl.
CPC ...... *G06F 11/0754* (2013.01); *G01R 19/2503* (2013.01); *G06F 11/0727* (2013.01); *G06N 10/00* (2019.01); *H04B 10/07953* (2013.01); *H04B 10/54* (2013.01); *H04B 10/70* (2013.01); *H04L 9/0852* (2013.01); *H04L 9/0858* (2013.01)

(58) Field of Classification Search
CPC ............. G06F 11/0754; G06F 11/0727; G01R 19/2503; G06N 10/00; H04B 10/07953; H04B 10/54; H04B 10/70; H04B 10/5057; H04L 9/0852; H04L 9/0858; H04L 1/203
See application file for complete search history.

(56) References Cited

U.S. PATENT DOCUMENTS 7,006,769 B1 * 2/2006 Kawasaki ............. G02F 1/0121
398/147
2010/0195831 A1 8/2010 Tanaka et al.

FOREIGN PATENT DOCUMENTS

| EP | 1742409 A1 | 1/2007 |
|---|---|---|
| EP | 3503461 A1 | 6/2019 |

OTHER PUBLICATIONS

Extended European Search Report dated Jul. 2, 2020.

* cited by examiner

*Primary Examiner* — Thien Nguyen
(74) *Attorney, Agent, or Firm* — Thomas Coester Intellectual Property (57) ABSTRACT

The invention relates to a IM bias voltage determining method adapted to determine an IM bias voltage corresponding to a desired Quantum Bit Error Rate based on the following formula $$Q(V_{IM}) = Q_0 + \frac{R_{err}}{R_{err} + R_{cor}}$$

where $Q(V_{IM})$ is the QBER dependent of the IM bias voltage $V_{IM}$, $Q_0$ is the optimal minimal QBER, $R_{err}$ is the number of erroneous detections, $R_{cor}$ is the number of correct detections and $V_{IM}$ is the IM bias voltage.

8 Claims, 5 Drawing Sheets

QUANTUM BIT ERROR RATE MINIMIZATION METHOD

TECHNICAL FIELD

The present invention relates to a system and a method for minimizing the Quantum Bit Error Rate at start-up phase and during quantum communication and more particularly to an improved method for minimizing the time needed to determine an intensity modulator bias voltage at the quantum communication transmitter system that minimizes the Quantum Bit Error Rate at start-up phase and during operation in quantum communication.

BACKGROUND OF THE INVENTION

The present invention relates generally to the field of quantum communication, and more precisely to a method used in Quantum Key Distribution systems.

Quantum cryptography or quantum key distribution, in the following also referred to as QKD, is a method allowing the distribution of a secret key between two distant parties, the emitter (Alice) and the receiver (Bob), with a provable absolute security. Quantum key distribution relies on quantum physics principles and encoding information in quantum states, or qubits, as opposed to classical communication's use of bits. Usually, photons are used for these quantum states. Quantum key distribution exploits certain properties of these quantum states to ensure its security.

More particularly, the security of this method comes from the fact that the measurement of a quantum state of an unknown quantum system modifies the system itself. In other words, a spy eavesdropping on a quantum communication channel cannot get information on the key without introducing errors in the key exchanged between the emitter and the receiver thereby informing the user of an eavesdropping attempt.

The encryption devices enable secure transmission of useful payload by performing some kind of symmetric encryption using the keys exchanged by quantum key distribution. Specific quantum key distribution systems are described for instance in U.S. Pat. No. 5,307,410, and in the article by C. H. Bennett entitled "Quantum cryptography using any two non-orthogonal states", Phys. Rev. Lett. 68, 3121 (1992).

QKD is a protocol that allows the exchange of secret keys in the active scenario. In a QKD protocol, the communication channel between the two users is known as a quantum channel. A quantum channel is a communication channel, which transmits quantum particles, typically photons, in a way that conserves their quantum characteristics. There are two sets of parameters, which are used for quantum encoding. One is the polarization of the photons, and the second is the phase, which requires the use of interferometers. Both have their advantages and drawbacks depending on the physical layer of the quantum channel and the type of QKD protocol.

The basic idea behind QKD is that the eavesdropper is allowed to intercept the signal and process it in any way compatible with quantum mechanics. Nevertheless, the legal users, known as Emitter and Receiver, can still exchange a secure key.

Commercial systems for ground QKD, distributed over an optical fiber, have been developed, inter alia by ID Quantique. In all practical implementations of ground QKD, the parameter used for quantum encoding is the phase, or a related timing parameter for some protocol. The reason is that, as polarization is not conserved in an optical fiber, polarization schemes require complicated and expensive components. On the other hand, interferometric detection is easier to realize in single-mode optical fibers, which is the medium of choice for ground QKD.

One should note that an important parameter for quantum communication in general, and quantum key distribution in particular, is the signal-to-noise ratio of the quantum communication channel. In the case of QKD systems, the parameter, which is used to determine if the channel has a sufficient signal-to-noise ratio, is usually called quantum bit error rate (QBER). This parameter is related to the inverse of the signal-to-noise ratio, hence the higher the signal-to-noise-ratio, the lower the error rate with respect to the signal rate, and the lower the QBER. The QBER value is measured by QKD systems and determines the final QKD secret key yield after the privacy amplification post-processing step. When the QBER value is above a predefined threshold value, the QKD system cannot generate any secret keys from the qubit exchange.

In the concept of QKD, all errors as measured by the QBER are attributed to eavesdropping attacks, and therefore reduce the final secret key yield. Therefore, in practical systems all other error sources, in particular those of the system itself, have to be minimized. In systems that use an intensity modulator (IM) for the preparation of quantum states, one such source of errors that can lead to an increased QBER is a misaligned working point of the IM's bias voltage. An intensity modulator modulates the intensity of light based on electrical input signals, but if its bias voltage is misaligned, then light still passes even though it's supposed to be blocked, and leads to errors in the quantum communication process. An example of a QKD system that uses an IM for the quantum state preparation is the Coherent One-Way (COW) protocol. There, the quantum states are prepared in time-bins closely related to pulse-position modulation. An optical pulse that is prepared in only the first of two time-bins corresponds to a bit value zero, and an optical pulse only in the second time-bin corresponds to a bit value one. As per QKD, also the superposition state with both time-bins containing optical pulses are used in the COW protocol. However, if the bias voltage of the intensity modulator is misaligned, then the time-bins that are supposed to be empty still contain some light which can be detected by the receiver and lead to errors and an increased QBER.

A misalignment of the IM bias voltage can for example be due to variations of the IM temperature, or due to charge diffusion effects within the IM material.

Therefore, since the QBER value depends on temperature variation and charge diffusion effects within the intensity modulator, the optimal working point of the IM's bias voltage (which therefore minimizes the QBER) varies over time and is a-priori unknown. For this reason, the optimal IM's bias voltage, also known as optimal working point, has to be determined during the start-up and alignment phase of the used QKD system, and its variation has to be tracked during the QKD operation in order to minimize the QBER and maintain optimum performance.

In current systems, one uses a feedback based method which repeats several times the same measurement/comparison step to find an optimum point. According to this method which his shown in FIGS. 1a and 1b, one first applies an initial bias voltage $V_{IM}$ to the IM, accumulates sufficient detections related to the QBER parameters, and calculates the initial QBER value.

Once the initial QBER value has been determined, one adds a fix voltage value $\Delta V$ to the currently applied bias voltage in one direction (plus or minus, i.e. left or right in FIG. 1b) and one applies this new voltage $V_{IM}+\Delta V$ (+ or − according to the direction chosen beforehand). As before, once sufficient detections have been accumulated, the new QBER value associated with the new bias voltage is calculated.

If the new QBER is smaller than the previous one then the preceding step is repeated as many times as necessary to find a desired $V_{IM}$ producing a minimum QBER.

If the QBER is not smaller than the previous one, and is therefore larger, then one changes the chosen direction and repeats the above steps. Therefore, the direction by which $\Delta V$ is applied to $V_{IM}$ (added or subtracted) is changed whenever a higher QBER than the previous is measured in this method.

Although this method permits to align and track the IM's bias voltage corresponding to minimum QBER, the application of a constant voltage step size $\Delta V$ can lead to a large number of iterations of the above regulation cycle before the optimum working point has been found, with every iteration requiring some time to accumulate enough detections. To speed up the alignment process, one could increase the step size $\Delta V$, which decreases the number of iterations and, hence, the total alignment time. However, the larger the step size $\Delta V$, the less precise is the stabilization around the optimum working point, which effectively results in a QBER during operation that is higher than the minimum. In contrast, if the step size is reduced in order to increase the precision around the optimum working point, then the number of alignment iterations increases and results in longer waiting time before the working point has been found.

In this regard, a primary objective of the invention is to solve the above-mentioned problems and more particularly to provide a method which rapidly and reliably aligns and tracks the optimum IM bias voltage that yields the minimum QBER. More particularly, the present invention aims at providing a method which increases the speed of the initial alignment and optimization of the IM's bias voltage for minimizing the QBER while maintaining high precision around the working point.

SUMMARY OF THE INVENTION

In order to solve the above-mentioned problems, the inventors have developed an analytical model and an analytical formula permitting to easily and rapidly calculate a non-constant, variable step value $\delta V$ (instead of using a constant step size $\Delta V$) on the fly during each regulation iteration. The step size $\delta V$ is calculated based on the QBER measured during the previous iteration and corresponds to the gap between the currently applied IM bias voltage and the optimum voltage, independently from both said optimum voltage (minimizing the QBER) and the current voltage.

A first aspect of the invention relates to an IM bias voltage determining method adapted to determine an IM bias voltage corresponding to a desired Quantum Bit Error Rate based on the following formula:

$$Q(V_{IM}) = Q_0 + \frac{R_{err}}{R_{err} + R_{cor}}$$

where $Q(V_{IM})$ is the QBER dependent of the IM bias voltage $V_{IM}$, $Q_0$ is the optimal minimal QBER, $R_{err}$ is the number of erroneous detections, $R_{cor}$ is the number of correct detections and $V_{IM}$ is the IM bias voltage.

According to a preferred embodiment, the predetermined Quantum Bit Error Rate is a minimum Quantum Bit Error Rate.

Advantageously, $$\frac{R_{err}}{R_{err} + R_{cor}} = \frac{1 - \cos\left[\pi \cdot \frac{V_{IM} - V_0}{V_\pi}\right]}{2 - \cos\left[\pi \cdot \frac{V_{IM} - V_0}{V_\pi}\right] + \frac{\sin\left[\pi \cdot \frac{V_{IM} - V_0}{V_\pi}\right] - \sin\left[\pi\left(\frac{V_{IM} - V_0}{V_\pi} + \alpha_{RF}\right)\right]}{\pi \cdot \alpha_{RF}}}$$

where $Q(V_{IM})$ is the QBER dependent of the IM bias voltage $V_{IM}$ $Q_0$ is the minimal achievable QBER limited by other error sources $R_{err}$ is the number of erroneous detections $R_{cor}$ is the number of correct detections $V_{IM}$ is the IM bias voltage $V_0$ is the optimal set voltage producing a minimum QBER $V_\pi$ is PI-voltage that corresponds to half the voltage difference between two QBER minima $\alpha_{RF}$ is a scaling factor that accounts for the effective amplitude of the fast RF voltage pulses and which is calibrated beforehand.

Preferably, the IM bias voltage determining method comprises a $\delta V$ calculating step consisting in determining a voltage value $\delta V$ corresponding to a correction value to be applied to $V_{IM}$ to obtain the optimal set voltage producing a minimum QBER.

Advantageously, the $\delta V$ calculating step is carried out by applying the following formula:

$$\partial V = \pm \frac{V_\pi}{\pi} \cdot \text{ArcCos}\left[\sqrt{\Delta Q^3 \sin\left[\frac{\beta}{2}\right]^4 \left(\frac{\beta^2\left(1 - \frac{3\Delta Q}{2}\right) + \Delta Q - }{\Delta Q \cdot \cos[\beta] - \beta(1 - \Delta Q)\sin[\beta]}\right)} \cdot \frac{\beta(1 - 2\Delta Q)(\beta(1 - \Delta Q) - \Delta Q \cdot \sin[\beta]) \pm 2\sqrt{2}}{\beta^2 \cdot (1 - \Delta Q)^2 + 2 \cdot \Delta Q^2 - 2 \cdot \Delta Q \cdot (\Delta Q \cdot \cos[\beta] + \beta \cdot (1 - \Delta Q) \cdot \sin[\beta])}\right]$$

where $\Delta Q = Q - Q_0$ and $\beta = \alpha_{RF} \cdot \pi$.

According to a preferred embodiment, the IM bias voltage determining method further comprises adding said correction value $\delta V$ to $V_{IM}$ in a first direction, i.e. positive or negative way, to obtain the optimal set voltage producing a minimum QBER, and if the obtained QBER is not minimal, adding said correction value $\delta V$ to $V_{IM}$ in a second direction, opposite to the first direction.

Preferably, the IM bias voltage determining method is adapted to be carried out at start-up phase.

Advantageously, the IM bias voltage determining method further comprises a QBER tracking step adapted to detect a QBER variation and adapted to be carried out during quantum communication upon detection of a QBER variation.

A second aspect of the invention relates to a quantum communication system comprises an IM bias voltage determining module carrying out the IM bias voltage determining method of any one of the preceding claims.

BRIEF DESCRIPTION OF THE DRAWINGS

The invention will be described with reference to the drawings, in which the same reference numerals indicate the same feature. In particular.

DETAILED DESCRIPTION

The invention will be described, for better understanding, with reference to specific embodiments. It will however be understood that the invention is not limited to the embodiments herein described but is rather defined by the claims and encompasses all embodiments which are within the scope of the claims.

As mentioned above, the present invention aims at reducing the start-up phase in quantum communication by increasing the speed of initial alignment and optimization of the intensity modulator's bias voltage for minimizing the QBER.

Figure 1A:
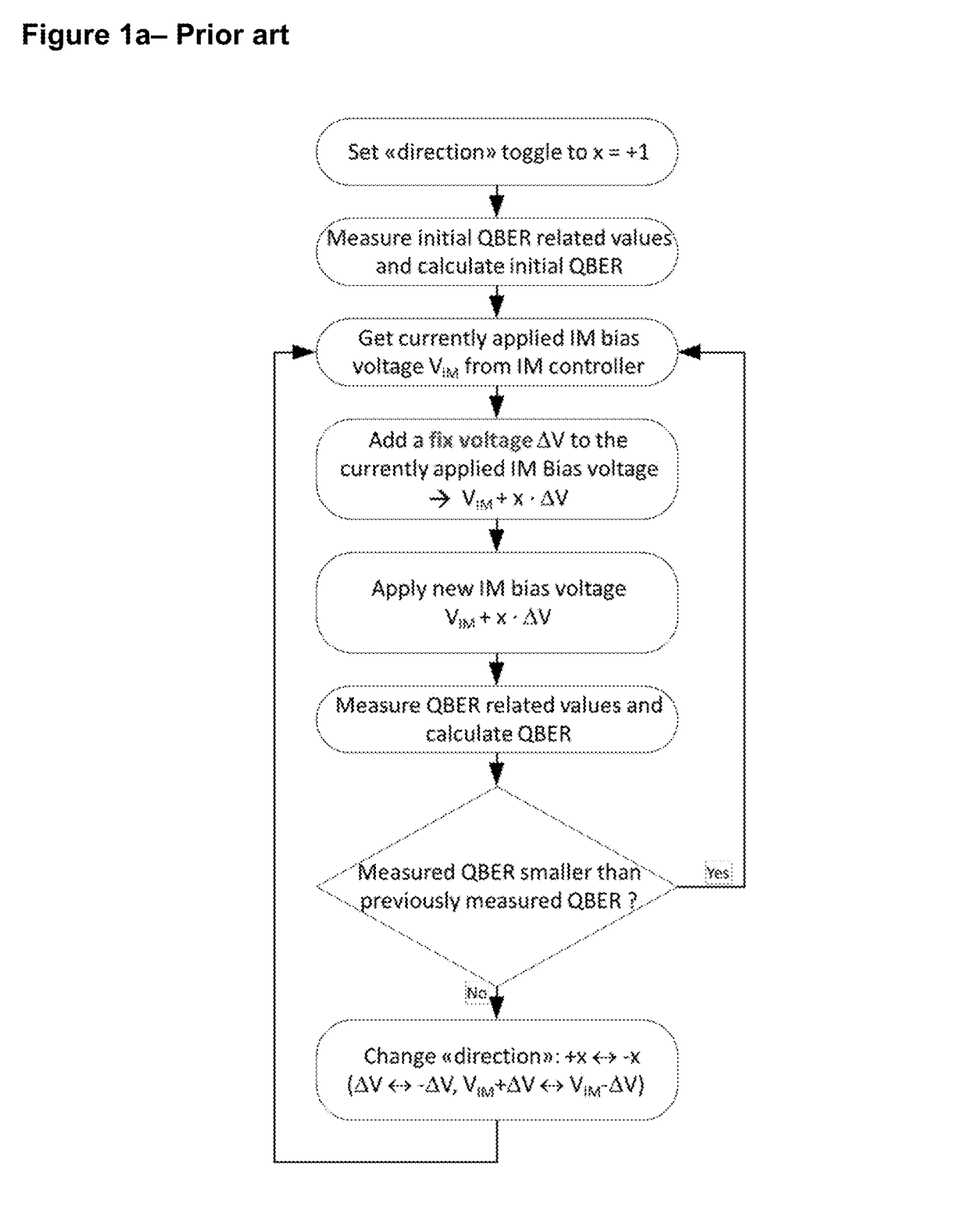
FIG. 1a is a block diagram of a conventional optimum IM's bias voltage determining method with a fix voltage step size $\Delta V$.
Figure 1B:
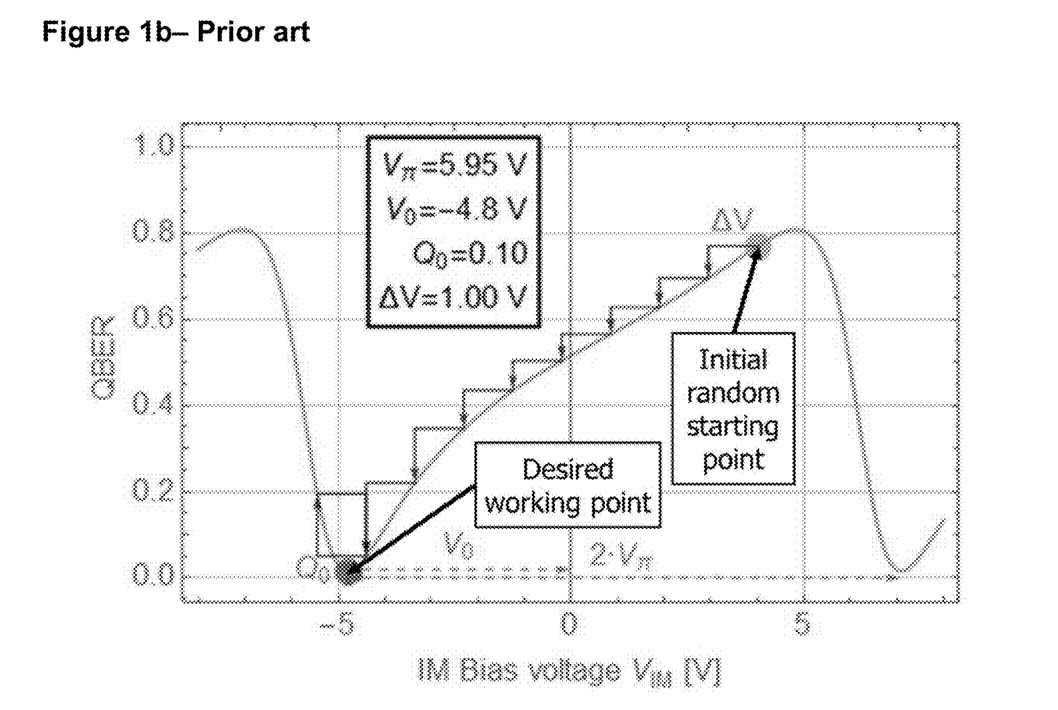
FIG. 1b—is a QBER vs IM bias voltage plot showing the several steps carried out in the conventional optimum IM's bias voltage determining method with a fix voltage step size $\Delta V$. The green point indicates the arbitrarily selected starting bias voltage and corresponding QBER value, the red point the desired working point at $V_0$ that is to be determined by the alignment method. The black lines indicate the individual iterations. As can be seen, if the step size $\Delta V$ is too large, the optimum working point can never be reached.

FIGS. 1a and 1b show the current method which is carried out to find the desired IM bias voltage for minimizing the QBER during QKD operation with a fix voltage step size $\Delta V$.

According to this method, one first applies an initial bias voltage $V_{IM}$ to the IM, and then accumulates sufficient detections related to the QBER parameters and calculates the initial QBER value. In the example of FIG. 1b, the initial bias voltage is $V_{IM}=4V$.

Once the initial QBER value has be determined, one adds a fix voltage value $\Delta V$ ($\Delta V=1V$ in the example of FIG. 1b) to the currently applied bias voltage in one direction (plus or minus, i.e. left or right in FIG. 1b) and one applies this new voltage $V_{IM}+\Delta V$ (+ or − according to the direction chosen beforehand) and measures the new QBER associated with this new voltage.

If the new QBER is smaller than the previous one then the preceding step is repeated as many times as necessary to find a desired $V_{IM}=V_0$ producing a minimum QBER.

If the QBER is not smaller than the previous one, and is therefore larger, then one changes the chosen direction and repeats the above steps. Therefore, the direction by which $\Delta V$ is applied to $V_{IM}$ (added or subtracted) is changed whenever a higher QBER is measured in this method (also called regulation cycle).

As stated above, the duration until the optimal working point is found is usually too long. The inventor has therefore developed an analytical model which describes the relationship between QBER and IM bias voltage.

Figure 2A:
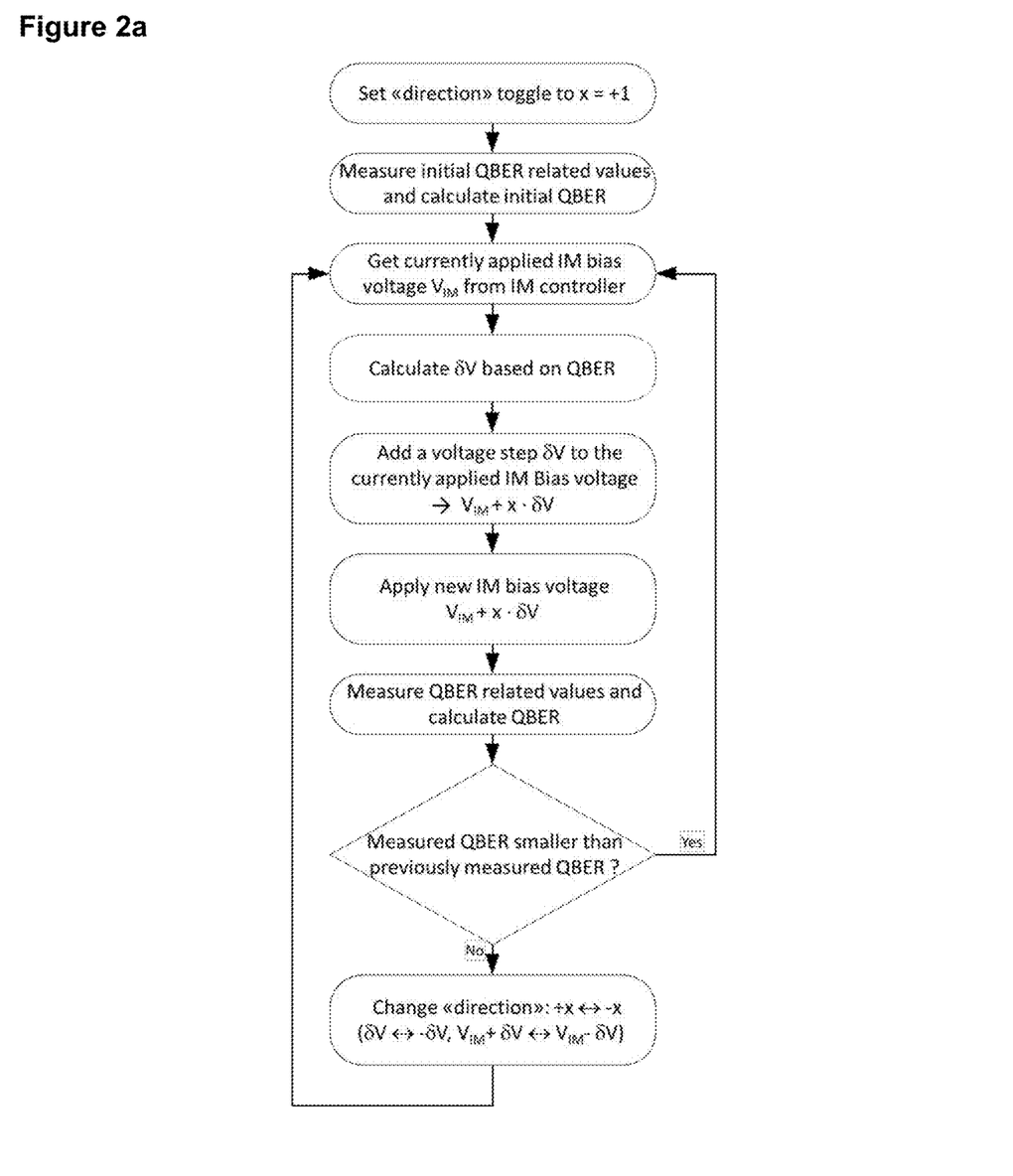
FIG. 2a is a block diagram of the present optimum IM's bias voltage determining method with a dynamic voltage step size $\delta V$.
Figure 2B:
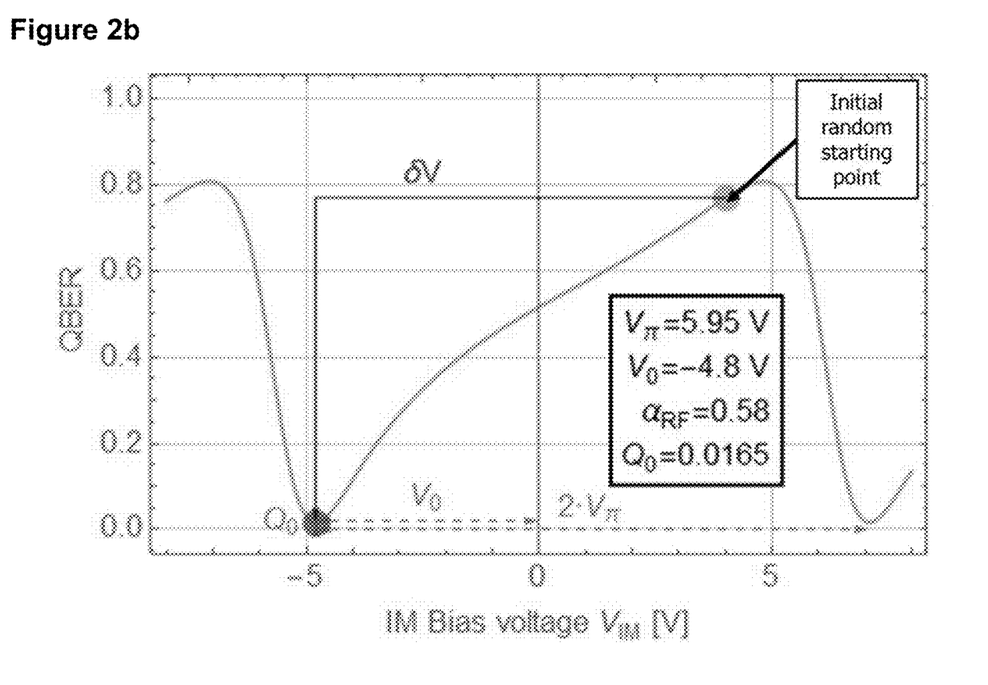
FIG. 2b—is a QBER vs IM bias voltage plot showing the present optimum IM's bias voltage determining method with a dynamic voltage step size $\delta V$. The green point indicates the arbitrarily selected starting bias voltage and corresponding QBER value, the red point the desired working point at $V_0$ that is to be determined by the alignment method. As can be seen, by applying the calculated step size $\delta V$ once, the optimum working point can be reached immediately.

The IM transfer function between the applied IM bias voltage $V_{IM}$ and the resulting optical attenuation is commonly described as $$\frac{1}{2} - \frac{1}{2}\cos\left[\frac{\pi \cdot (V - V_0)}{V_\pi}\right],$$

where $V_\pi$ is called PI-voltage and corresponds to half the voltage between two output minimums (indicated by the grey arrow in FIGS. 1b and 2b). The dynamic voltage V is the sum $V=V_{RF}+V_{IM}$ between the IM bias voltage $V_{IM}$ and the high-frequency modulation voltage $V_{RF}$. The voltage $V_0$ is the a-priori unknown offset voltage that minimizes the optical output power after the IM, and is the one that has to be determined by the regulation method. The modulation voltage $V_{RF}$ is rapidly varied in accordance with the quantum communication protocol to produce the corresponding optical output amplitude pattern.

The integration of the output amplitude over the valid time-bins is proportional to number of detections $R_{cor}$ that will be correctly detected and gives $$R_{cor} \propto \frac{\pi \cdot \alpha_{RF} + \sin\left[\pi \cdot \frac{V_{IM} - V_0}{V_\pi}\right] - \sin\left[\pi \cdot \frac{V_{IM} - V_0}{V_\pi} + \pi \cdot \alpha_{RF}\right]}{\pi \cdot \alpha_{RF}}.$$

Here, $\alpha_{RF}$ is a filling factor that accounts for the effective amplitude of the fast RF voltage pulses and which is calibrated beforehand. The integration of the output amplitude over the invalid time-bins is proportional to number of erroneous detections $R_{err}$ and gives $$R_{err} \propto 1 - \cos\left[\pi \cdot \frac{V_{IM} - V_0}{V_\pi}\right].$$

Therefore, the QBER that results from this model is given by $$Q(V_{IM}) = \frac{R_{err}}{R_{err} + R_{cor}} = Q_0 + \frac{1 - \cos\left[\pi \cdot \frac{V_{IM} - V_0}{V_\pi}\right]}{2 - \cos\left[\pi \cdot \frac{V_{IM} - V_0}{V_\pi}\right] + \frac{\sin\left[\pi \cdot \frac{V_{IM} - V_0}{V_\pi}\right] - \sin\left[\pi \cdot \left(\frac{V_{IM} - V_0}{V_\pi} + \alpha_{RF}\right)\right]}{\pi \cdot \alpha_{RF}}}$$

where $Q(V_{IM})$ is the QBER dependent of the IM bias voltage $V_{IM}$ $Q_0$ is the minimal achievable QBER limited by other error sources $R_{err}$ is the number of erroneous detections
$R_{cor}$ is the number of correct detections
$V_{IM}$ is the IM bias voltage
$V_0$ is the optimal set voltage producing a minimum QBER
$V_\pi$ is PI-voltage that corresponds to half the voltage difference between two QBER minima
$\alpha_{RF}$ is a scaling factor that accounts for the effective amplitude of the fast RF voltage pulses and which is calibrated beforehand.

By inverting the above equation, a formula for the required dynamic step size $\partial V = V_{IM} - V_0$ can be derived. Since the inversion can result in different realizations of the same formula, here only one is given exemplarily:

$$\partial V = \pm \frac{V_\pi}{\pi} \cdot \text{ArcCos} \begin{bmatrix} \beta(1-2\Delta Q)(\beta(1-\Delta Q) - \Delta Q \cdot \text{Sin}[\beta]) \pm 2\sqrt{2} \\ \sqrt{\begin{array}{c} \Delta Q^3 \text{Sin}\left[\frac{\beta}{2}\right]^4 \left(\beta^2 \left(1 - \frac{3\Delta Q}{Z}\right) + \Delta Q - \right. \\ \Delta Q \cdot \text{Cos}[\beta] - \beta(1-\Delta Q) \text{Sin}[\beta]) \end{array}} \\ \hline \beta^2 \cdot (1-\Delta Q)^2 + 2 \cdot \Delta Q^2 - \\ 2 \cdot \Delta Q \cdot (\Delta Q \cdot \text{Cos}[\beta] + \beta \cdot (1-\Delta Q) \cdot \text{Sin}[\beta]) \end{bmatrix}$$

For simplification, it is $\Delta Q = Q - Q_0$ and $\beta = \alpha_{RF} \cdot \pi$.

This analytical result allows calculating the required step value $\delta V$ and therefore the bias voltage that minimizes the QBER immediately on the basis of the previously measured QBER. Hence, it's sufficient to apply the new IM bias voltage $V_{IM} + \delta V$ to find the optimal working point. Since the formula gives no indication about the direction in which the voltage step has to be applied (whether $V_{IM} + \partial V$ or $V_{IM} - \partial V$), the first iteration may result in an incorrect bias voltage, in which case the direction has to be changed by applying $V_{IM} - \partial V$.

It is therefore possible to drastically reduce the time needed for measuring the optimal IM bias voltage needed for minimizing the QBER during quantum communication both, at start-up phase, and during operation in case of QBER raise due to temperature or charge drifts.

Figure 3:
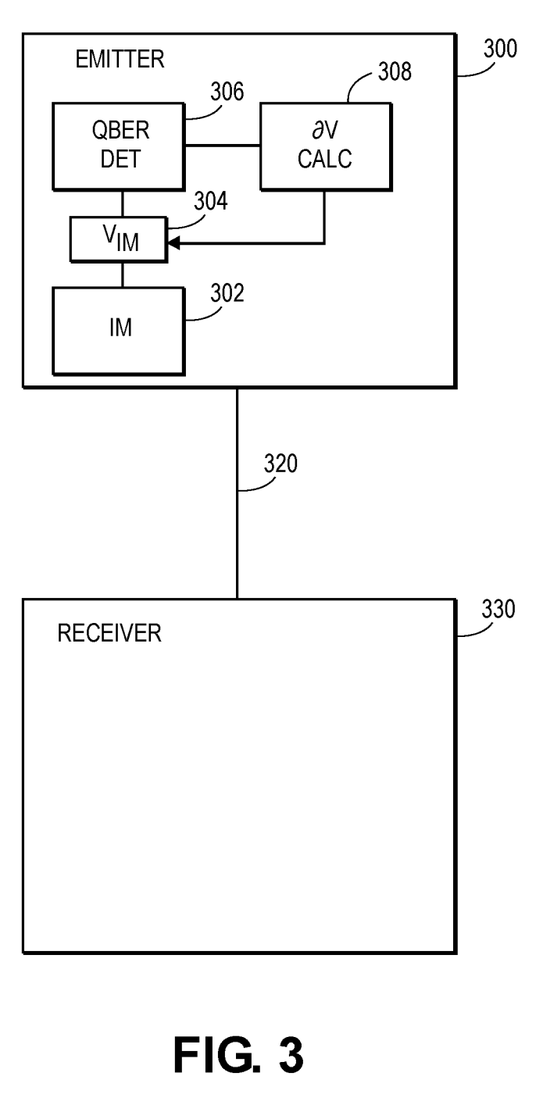
FIG. 3 is a block diagram of a system of one embodiment of the invention.

FIG. 3 is a block diagram of a system of one embodiment of the invention. An emitter 300 communicates with a receiver 330 over a quantum communication channel 320. To facilitate quantum key distribution over the quantum channel 320, it is desirable to optimize the bias voltage $V_{IM}$ applied to the intensity modulator 302 so that QBER is minimized. A voltage source 304 applies an initial $V_{IM}$ to the intensity modulator 302. A quantum bit error rate (QBER) detection module 306 determines a QBER at an existing bias voltage based on the error rate seen with the $V_{IM}$ that is being applied. This determination is performed consistent with the method described above. Using the QBER and the known current $V_{IM}$, a dynamic voltage step calculation module 308 calculates a dynamic voltage step $\delta V$ that will minimize the QBER when the current $V_{IM}$ is incremented or decremented by the voltage step $\delta V$. $\delta V$ is provided to the voltage source 304 that then shifts the voltage applied to bias the intensity modulator 302 such that $V_{IM}$ is incremented or decremented by the voltage step $\delta V$. The manner in which $\delta V$ may be calculated is described in detail above.

The QBER detection module 306 then redetermines the QBER at the new $V_{IM}$ and if the QBER is reduced from the prior determination no further action is required. If the QBER has increased, the original $V_{IM}$ is shifted in the opposite direction (i.e. if it was initially incremented, it is decremented and vice versa) by $\delta V$. In this way a maximum of two iterations are required to achieve a $V_{IM}$ that yield and optimal QBER. As the system operates, as noted above, e.g., temperature changes may require recalibration of $V_{IM}$, but each calibration requires no more than two iterations.

While the embodiments have been described in conjunction with a number of embodiments, it is evident that many alternatives, modifications and variations would be or are apparent to those of ordinary skill in the applicable arts. Accordingly, this disclosure is intended to embrace all such alternatives, modifications, equivalents and variations that are within the scope of this disclosure. This is for example particularly the case regarding the different apparatuses which can be used.

The invention claimed is:

1. A method to substantially minimize quantum bit error rate in a quantum key distribution system comprising:
   i) determining an initial quantum bit error rate (QBER) for a quantum channel;
   ii) using an existing intensity modulator bias voltage (VIM) to calculate a dynamic voltage step size $\delta V$ that, if applied to VIM, will yield a minimum QBER;
   iii) applying a voltage step of dynamic voltage step size in a first direction to the existing VIM to yield a stepped VIM;
   iv) redetermining a QBER existing using the stepped VIM;
   v) applying the voltage step in a second direction opposite the first direction to the existing $V_{IM}$ if and only if the redetermined QBER is greater than the initial QBER and leaving VIM unchanged if the redetermined QBER in less than the initial QBER.

2. The method of claim 1 wherein the method is initiated during a start up phase of a quantum key distribution system.

3. The method of claim 1 further comprising:
   tracking the QBER during operation of a quantum communication;
   detecting a variation in QBER during the quantum communication; and
   repeating operations ii)-iv) responsive to the detecting of a variation.

4. The method of claim 1 wherein $$Q(V_{IM}) = Q_0 + \frac{R_{err}}{R_{err} + R_{cor}}$$

where $Q(V_{IM})$ is the QBER dependent of the IM bias voltage $V_{IM}$
$Q_0$ is the optimal minimal QBER
$R_{err}$ is the number of erroneous detections
$R_{cor}$ is the number of correct detections
$V_{IM}$ is the IM bias voltage.

5. The method of claim 4, wherein $$\frac{R_{err}}{R_{err} + R_{cor}} = \frac{1 - \text{Cos}\left[\pi \cdot \frac{V_{IM} - V_0}{V_\pi}\right]}{2 - \text{Cos}\left[\pi \cdot \frac{V_{IM} - V_0}{V_\pi}\right] + \text{Sin}\left[\pi \cdot \frac{V_{IM} - V_0}{V_\pi}\right] - \text{Sin}\left[\pi \cdot \left(\frac{V_{IM} - V_0}{V_\pi} + \alpha_{RF}\right)\right]}{\pi \cdot \alpha_{RF}}$$

where $Q(V_{IM})$ is the QBER dependent of the IM bias voltage $V_{IM}$
$Q_0$ is the minimal achievable QBER limited by other error sources $R_{err}$ is the number of erroneous detections
$R_{cor}$ is the number of correct detections
$V_{IM}$ is the IM bias voltage
$V_0$ is the optimal set voltage producing a minimum QBER
$V_\pi$ is PI-voltage that corresponds to half the voltage difference between two QBER minima
αRF is a scaling factor that accounts for the effective amplitude of the fast RF voltage pulses and which is calibrated beforehand.

6. The method of claim 1, wherein δV is calculated according to the following formula:

$$\partial V = \pm \frac{V_\pi}{\pi} \cdot \text{ArcCos} \left[ \frac{\beta(1-2\Delta Q)(\beta(1-\Delta Q) - \Delta Q \cdot \text{Sin}[\beta]) \pm 2\sqrt{2} \sqrt{\Delta Q^3 \text{Sin}\left[\frac{\beta}{2}\right]^4 \left(\beta^2\left(1-\frac{3\Delta Q}{2}\right) + \Delta Q - \Delta Q \cdot \text{Cos}[\beta] - \beta(1-\Delta Q)\text{Sin}[\beta]\right)}}{\beta^2 \cdot (1-\Delta Q)^2 + 2 \cdot \Delta Q^2 - 2 \cdot \Delta Q \cdot (\Delta Q \cdot \text{Cos}[\beta] + \beta \cdot (1-\Delta Q) \cdot \text{Sin}[\beta])} \right]$$

where $\Delta Q = Q - Q_0$ and $\beta = \alpha_{RF} \cdot \pi$.

7. A Quantum Key Distribution (QKD) system comprising:
an intensity modulator;
a quantum bit error rate (QBER) determination module to determine the QBER based on an existing intensity modulator bias voltage $V_{IM}$;
a dynamic voltage step size calculation module to calculate a dynamic voltage step size δV to optimize QBER, wherein if δV applied to VIM in a correct direction it will yield a minimum QBER;
wherein a voltage step of the size δV is applied in a first direction to an existing VIM to yield a stepped VIM and a QBER existing using the stepped VIM is redetermined; and
wherein the voltage step is applied in a second direction opposite the first direction to the existing $V_{IM}$ if and only if the redetermined QBER is greater than the initial QBER and the VIM is left unchanged if the redetermined QBER is less than the initial QBER.

8. The system of claim 7 where in the dynamic voltage step size is calculated according to the formula:

$$\partial V = \pm \frac{V_\pi}{\pi} \cdot \text{ArcCos}\left[ \frac{\beta(1-2\Delta Q)(\beta(1-\Delta Q) - \Delta Q \cdot \text{Sin}[\beta]) \pm 2\sqrt{2}\sqrt{\Delta Q^3 \text{Sin}\left[\frac{\beta}{2}\right]^4\left(\beta^2\left(1-\frac{3\Delta Q}{2}\right) + \Delta Q - \Delta Q \cdot \text{Cos}[\beta] - \beta(1-\Delta Q)\text{Sin}[\beta]\right)}}{\beta^2 \cdot (1-\Delta Q)^2 + 2 \cdot \Delta Q^2 - 2 \cdot \Delta Q \cdot (\Delta Q \cdot \text{Cos}[\beta] + \beta \cdot (1-\Delta Q) \cdot \text{Sin}[\beta])} \right]$$

where $\Delta Q = Q - Q_0$ and $\beta = \alpha_{RF} \cdot \pi$.

\* \* \* \* \*